No. 697,886. Patented Apr. 15, 1902.
D. C. RIPLEY.
GLASS GATHERING MACHINE.
(Application filed Mar. 14, 1901.)
(No Model.)
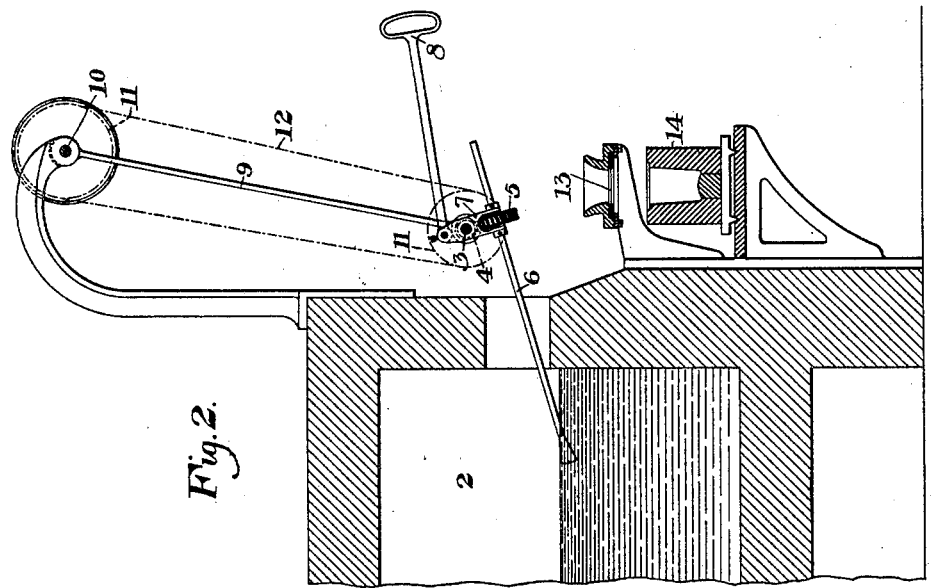
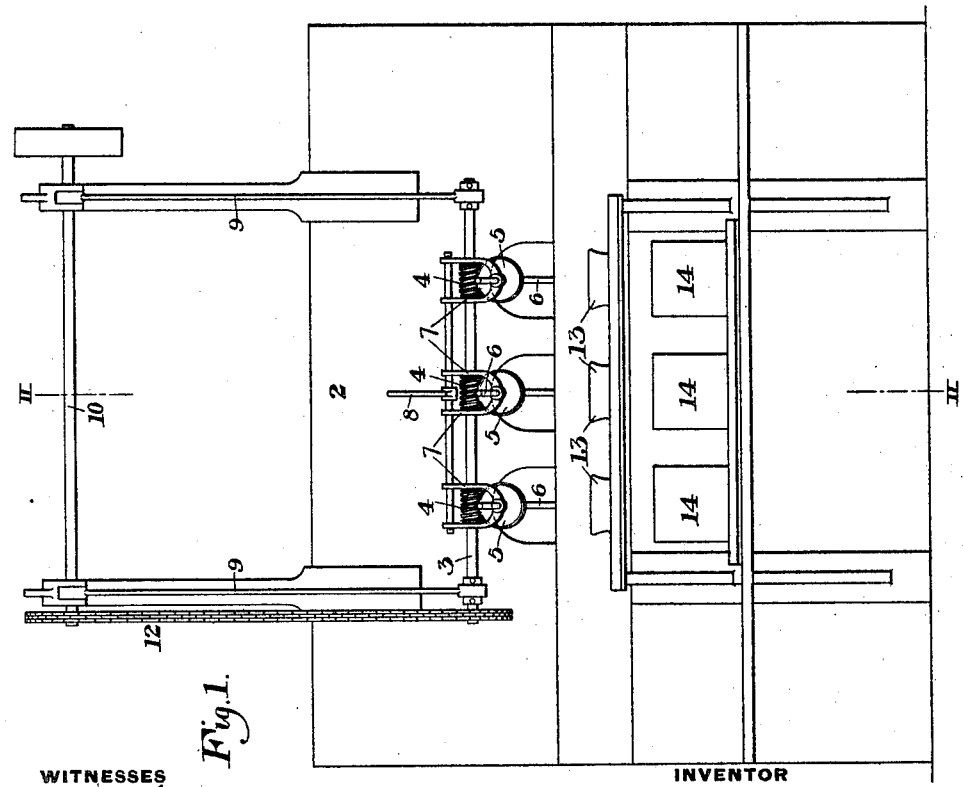
WITNESSES
INVENTOR

UNITED STATES PATENT OFFICE.

DANIEL C. RIPLEY, OF PITTSBURG, PENNSYLVANIA.

GLASS-GATHERING MACHINE.

SPECIFICATION forming part of Letters Patent No. 697,886, dated April 15, 1902.

Application filed March 14, 1901. Serial No. 51,108. (No model.)

*To all whom it may concern:*

Be it known that I, DANIEL C. RIPLEY, of Pittsburg, in the county of Allegheny and State of Pennsylvania, have invented a new and useful Glass-Gathering Machine, of which the following is a full, clear, and exact description, reference being had to the accompanying drawings, forming part of this specification, in which—

Figure 1 is a front elevation of my improved glass-gathering machine. Fig. 2 is a longitudinal section on the line II II of Fig. 1.

The gathering glass for use in molds is an operation of importance in the manufacture of glassware. It requires skill on the part of the workmen, and as the amount which can be gathered by one man has heretofore been limited by his individual capacity the work has required a large number of men in each establishment. The mechanical appliances heretofore devised for this purpose have not, so far as I know, been satisfactory; but it is the object of my invention to provide means by which the difficulties heretofore encountered are overcome and the work of gathering greatly facilitated. Such prior machines as I have seen operated have been unsuccessful, because they did not provide for the intelligent control of the gathering by a workman. Such control cannot be dispensed with, because of the conditions occasioned by variations of temperature of the glass; but by my machine the operation is perfectly under control, and all variations of this kind can be provided for.

My invention consists in a suitably-supported frame carrying two or more punties or gathering-irons combined with means for rotating them at an equal rate of speed, the frame being movable, so as to introduce the punties into the glass tank or pot, to withdraw them at the proper time, and to discharge the gatherings of glass into the molds, these movements of the frame being effected by the operator and being under his control, so that they can be made with proper regard to the condition and temperature of the glass.

In the drawings, 2 represents a glass-melting tank.

3 is a shaft carrying a series of worms 4, adapted to mesh with worm-wheels 5, formed on or fixed to gathering-irons 6 6. These gathering-irons are held in brackets 7, which are mounted on the shaft 3 and are provided with a handle or pilot 8. The shaft 3 is supported on the end of a frame 9, which is journaled concentrically to a driving-shaft 10, from which motion is communicated by sprockets 11 and a chain 12 or otherwise to the shaft 3. The workman by means of the handle 8 can swing the frame 9 so as to introduce the gathering-irons 6 into the glass in the tank or pot 2 and when bodies of glass have been gathered thereon can withdraw them and swing them over the mouth of cutters 13, under which stand molds 14 in proximity to the furnace. The glass can then be cut or detached from the gathering-irons and caused to drop into the molds and the molds moved to a press. The irons 6 rotate throughout the gathering operation and being on a single frame are introduced simultaneously into the furnace and all accumulate at the same time a gathering of glass upon their ends. As they all rotate at an equal rate of speed and as each dips into the same body of glass, they will act uniformly, and the gatherings upon each will be the same. The workman is therefore enabled to control all of them with like facility as if he were controlling a single one, and his capacity for work is therefore increased approximately in the ratio of the number of irons which are carried by the frame.

Within the scope of my invention modifications may be made in the construction and arrangement of the apparatus, and devices may be employed to regulate the speed of rotation of the gathering-irons, since

What I claim is—

1. In a glass-gathering device, a supporting-frame, said frame being movable toward and from the furnace, an axially-rotatable gathering-iron pivotally mounted in the frame, power-driven means for rotating the gathering-iron, and a handle or pilot by which said iron may be manually moved lengthwise within the furnace and tipped to and from the glass, substantially as described.

2. In a glass-gathering device, a supporting-frame, said frame being movable toward and from the furnace, axially-rotatable gathering-irons pivotally mounted in the frame, power-driven means for rotating the gathering-irons simultaneously, and a handle or pilot by which said irons can be manually moved lengthwise within the furnace and tipped to and from the glass, substantially as described.

3. A swinging frame, a shaft carried thereby and provided with worms, gathering-irons driven by the worms and carried by the frame, and an overhead driving-gear by which the shaft is rotated, substantially as described.

In testimony whereof I have hereunto set my hand.

DANIEL C. RIPLEY.

Witnesses:
H. M. CORWIN,
WARREN W. SWARTZ.